(12) United States Patent
Serizawa

(10) Patent No.: US 6,283,643 B1
(45) Date of Patent: Sep. 4, 2001

(54) FERULE STRUCTURE AND METHOD OF PROCESSING END OF OPTICAL FIBER TO BE COUPLED WITH FERULE STRUCTURE

(75) Inventor: Naoshi Serizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/454,998

(22) Filed: Dec. 6, 1999

(30) Foreign Application Priority Data

Apr. 20, 1999 (JP) .................................................. 11-111731

(51) Int. Cl.$^7$ ...................................................... G02B 6/36
(52) U.S. Cl. .................. 385/81; 385/62; 385/78; 385/60
(58) Field of Search .................................. 385/81, 83, 84, 385/78, 77, 76, 62

(56) References Cited

U.S. PATENT DOCUMENTS

| 4,447,121 | * | 5/1984 | Cooper | 385/81 |
| 4,767,177 | * | 8/1988 | Cartier | 385/81 |
| 5,621,835 | * | 4/1997 | Takahashi | 385/81 |
| 5,668,906 | * | 9/1997 | Yamamura | 385/81 |

FOREIGN PATENT DOCUMENTS

| 0 608 627 A2 | | 8/1994 | (EP) . |
| 0 626 602 A1 | | 11/1994 | (EP) . |
| 2111240 A | * | 6/1983 | (GB) . |

* cited by examiner

*Primary Examiner*—Audrey Chang
*Assistant Examiner*—Leo Boutsikaris
(74) *Attorney, Agent, or Firm*—Armstrong, Westerman, Hattori, McLeland & Naughton LLP

(57) ABSTRACT

A ferule structure for receiving an optical fiber composed of a core and a sheathing for covering the core exclusive of its end includes a core holder for holding the core; a sheath holder for holding the sheathing, communicating with the core holder and being located on an outer wall of the sheathing; and a metallic cylinder member for fixing the sheathing. The metallic member is formed integrally to the sheathing holder. The sheathing holder has a window from which the metallic cylinder member is partially exposed. The metallic cylinder member is caulked through the window so that the sheathing is compressed toward the core. In this configuration, the optical fiber and ferule can be surely secured to each other without using an adhesive.

9 Claims, 9 Drawing Sheets

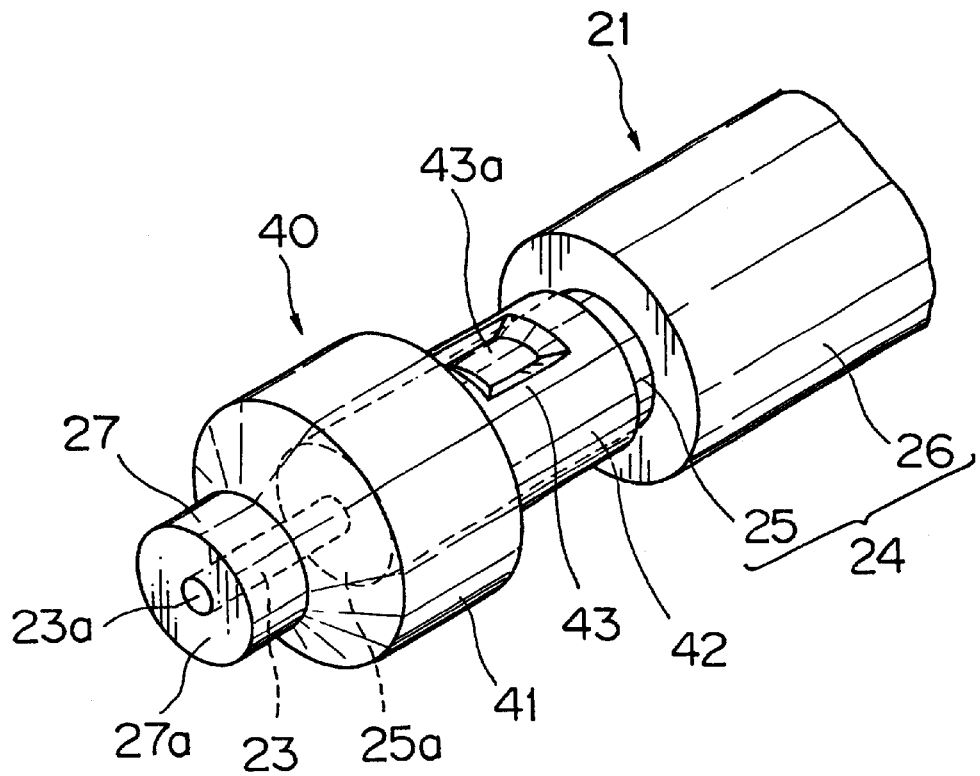
F I G. 1 3
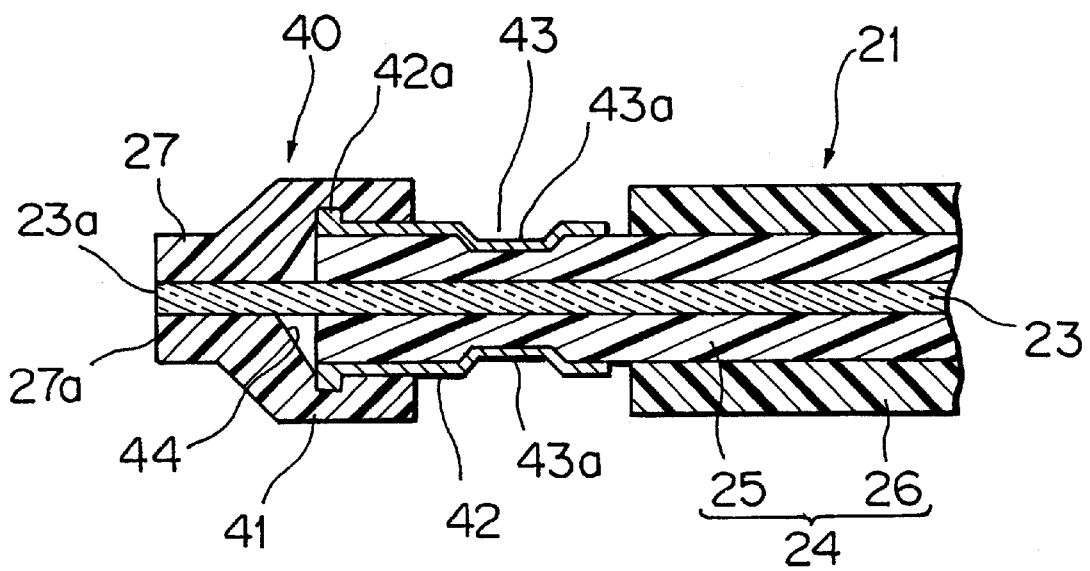
F I G. 1 4

FERULE STRUCTURE AND METHOD OF PROCESSING END OF OPTICAL FIBER TO BE COUPLED WITH FERULE STRUCTURE

BACKGROUND OF THE INVENTION

1. Field of the Invention

The present invention relates to a ferule into which an optical fiber is inserted which has a core covered with one or plural protecting films and not covered with its end, and a method of processing the end of the optical fiber.

2. Description of the Related Art

In a prior art, where optical fibers are connected to each other and a light emitting/receiving element is connected to an optical fiber, a ferule was securely attached to the end of the optical fiber.

Now referring to FIG. 16, an more detailed explanation will be given of the prior art. FIG. 16 is a sectional view of the attachment state between an optical fiber and a ferule, which is disclosed in JP-A-9-90163.

As seen from FIG. 16, a ferule, generally 1 is composed of an inner small-diameter cylinder 2 and an outer outer-diameter cylinder 3, which are stepped. The outer cylinder 3 is provided with a flange 4 on its outer wall. The flange 4 is adapted to receive urging force of a spring (not shown) mounted in an optical connector housing (not shown).

An optical fiber 5 has a core 6 covered with two sheathing films, an inner primary sheath 7 and an outer secondary sheath 8.

The small diameter cylinder 2 has an inner diameter that is slightly larger than the diameter of the core 6 of the optical fiber 5. The larger diameter cylinder 2 has also an inner diameter that is slightly larger than the outer diameter of the secondary sheath 8.

As seen from FIG. 16, the optical fiber 5 has an end which is covered with no sheathing film. The optical fiber 5, with an adhesive (two-liquid mixed epoxy resin adhesive in the above prior art) being applied to the outer surface of the optical fiber inclusive of the end, is inserted in the ferule 1. In this state, when the structure thus formed is heated for a prescribed time at a prescribed temperature, the optical fiber 5 and ferule 1 are coupled with each other with sufficient adhesive force.

The two-liquid mixed epoxy adhesive used in the prior art can provide great adhesive force. However, use of this adhesive requires a large number of working steps for processing or trimming for the end of the optical fiber 5, i.e. application of an adhesive, insertion of the optical fiber, wiping off of the excessive amount of adhesive, heating/hardening of the adhesive, etc. This influences the production cost.

Changes in the mixing ratio of the two adhesive liquids will vary the adhesive intensity. This will make the quality control complicate.

Further, heating/hardening of the adhesive which satisfies the condition of e.g. 100° C. and one hour requires a comparatively large heating device. Therefore, a sufficient working space must be assured. A limited working space cannot increase the number of times of heating/hardening, which leads to reduction in the productivity.

SUMMARY OF THE INVENTION

A first object of the present invention is to a ferule capable of making it easy to process or trim the end of an optical fiber to reduce the production cost and improve quality control and productivity.

A second object of the present invention is to provide a method for processing the end of the optical fiber.

A third object of the present invention is to provide an assembly of an optical fiber and a ferule which can be surely coupled with each other.

In order to attain the first object, in accordance with the present invention, there is provided a ferule for receiving a ferule composed of a core and a sheathing for covering the core exclusive of its end, comprising a core holder for holding the core;

a sheath holder for holding the sheathing, the sheath holder communicating with the core holder and being located on an outer wall of the sheathing; and a metallic cylinder member for fixing the sheathing, the metallic cylinder member being formed integrally to the sheath holder, wherein the sheathing holder has a window from which the metallic cylinder member is partially exposed; and the metallic cylinder member is caulked through the window so that the sheathing is compressed toward the core.

In this configuration, the optical fiber and ferule can be surely secured to each other without using any adhesive.

Specifically, with the optical fiber whose end is void of the sheathing being inserted into the ferule, the metallic cylinder member can be caulked to compress the sheathing toward the core. Thus, the above securing or fixing can be completed. The fixing force can be easily altered by changing the position and area subjected to caulking. Even if external force is applied to the optical fiber, the edge of the metallic cylinder member is caught by the sheathing. Thus, the fixing force between the ferule and the optical fiber is not reduced and the optical fiber will not be readily fallen off.

Since the metallic cylinder member is exposed through the window, caulking can be easily positioned. Thus, the caulking position is not shifted so that the operation of caulking can be stabilized every time, thereby keeping the fixing force constant.

The ferule, which can be previously manufactured by a separate process, does not exert an influence on the operation of fixing to the optical fiber. Since a large space is not required for the caulking, a change in the layout of a manufacturing location is not required.

Preferably, in the ferule, the window is located centrally in the sheathing holder in its longitudinal direction. For this reason, the caulking position can be made unaltered. Additionally, if the shape of the assembly after caulking is unaltered, when the assembly is mounted in an optical connector housing, a play or clearance of the ferule for the optical connector housing is also unaltered. This makes it easy to design the optical connector using the optical connector housing.

In the ferule, preferably, the metallic cylinder member is located internally of the outer wall of the sheath holder. Therefore, the metallic cylinder will not protrude from the sheathing holder. This makes it easy to set the assembly in a jig in a step after the caulking or to mount the assembly in an optical connector housing. Further, using a level difference formed between the outer wall of the sheathing holder and the metallic cylinder member for caulking, the assembly can be engaged with an engagement member of the optical connector housing. This prevent the assembly from being fallen from the optical connector housing.

Further, in the ferule, preferably, the sheath holder has an internal taper with which the sheath is brought into contact. This enhances the degree of fitness between the ferule and the optical fiber after assembled.

Further, in the ferule, preferably, the core and the core holder are aligned with each other in their end faces.

This configuration prevents random reflection of light at the end face of the core and reduces optical loss there.

Further, in the ferule, preferably, the core holder is made of synthetic resin. For this reason, when the optical fiber is mounted in the optical connector housing, or is received by a receptacle, the optical connector housing or receptacle will not be injured.

In order to attain the above second object, in accordance with the present invention, there is provided a method of processing and end of an optical fiber using the ferule according to the present invention, comprising the steps of:

inserting the optical fiber into the ferule until the core of the optical fiber protrudes from the core holder;

caulking the metallic cylindrical member so that the optical fiber and the ferule are fixed to each other; and cutting or grinding a portion of the core protruding from the core holder so that the core and the core holder are aligned with each other in their end faces.

In this process, since adhesive is not required to fix the ferule and optical fiber to each other, the end face of the optical fiber can be easily processed or trimmed. Specifically, when the ferule and optical fiber are fixed to each other using the adhesive, it takes a long time since the adhesive must be heated and hardened. On the other hand, the method of not using the adhesive according to the present invention can reduce the number of man hours required for heating/hardening the adhesive, thereby simplifying the processing of the end of the optical fiber. Of course, it is not necessary to manage the mixing rate of liquids of the adhesive. The working space for processing or trimming the end of the optical fiber can be easily assured. Thus, the method of processing the end of the optical fiber leads to reduction of production cost and improvement of quality control and productivity of the assembly of the optical fiber and the ferule.

In order to attain the third object of the present invention, there is provided an assembly of an optical fiber and a ferule comprising:

an optical fiber composed of a core and a sheath covering the core exclusive of its end; and a ferule for receiving the optical fiber, the ferule including a core holder for holding the core, a sheathing holder for holding the sheath, the sheath holder communicating with the core holder and being located on an outer wall of the sheathing; and a metallic cylinder member for fixing the sheathing, the metallic member being formed integrally to the sheath holder, wherein the sheath holder has a window from which the metallic cylinder member is partially exposed and the metallic cylinder member is caulked through the window so that the sheathing is compressed toward the core.

The above and other objects and features of the present invention will be more apparent from the following description taken in conjunction with the accompanying drawings.

BRIEF DESCRIPTION OF THE DRAWINGS

FIG. 13 is a perspective view of the state after caulking has been made for the state of FIG. 11;

FIG. 14 is a sectional view of the state of FIG. 13;

DESCRIPTION OF THE PREFERRED EMBODIMENTS

Figure 1:
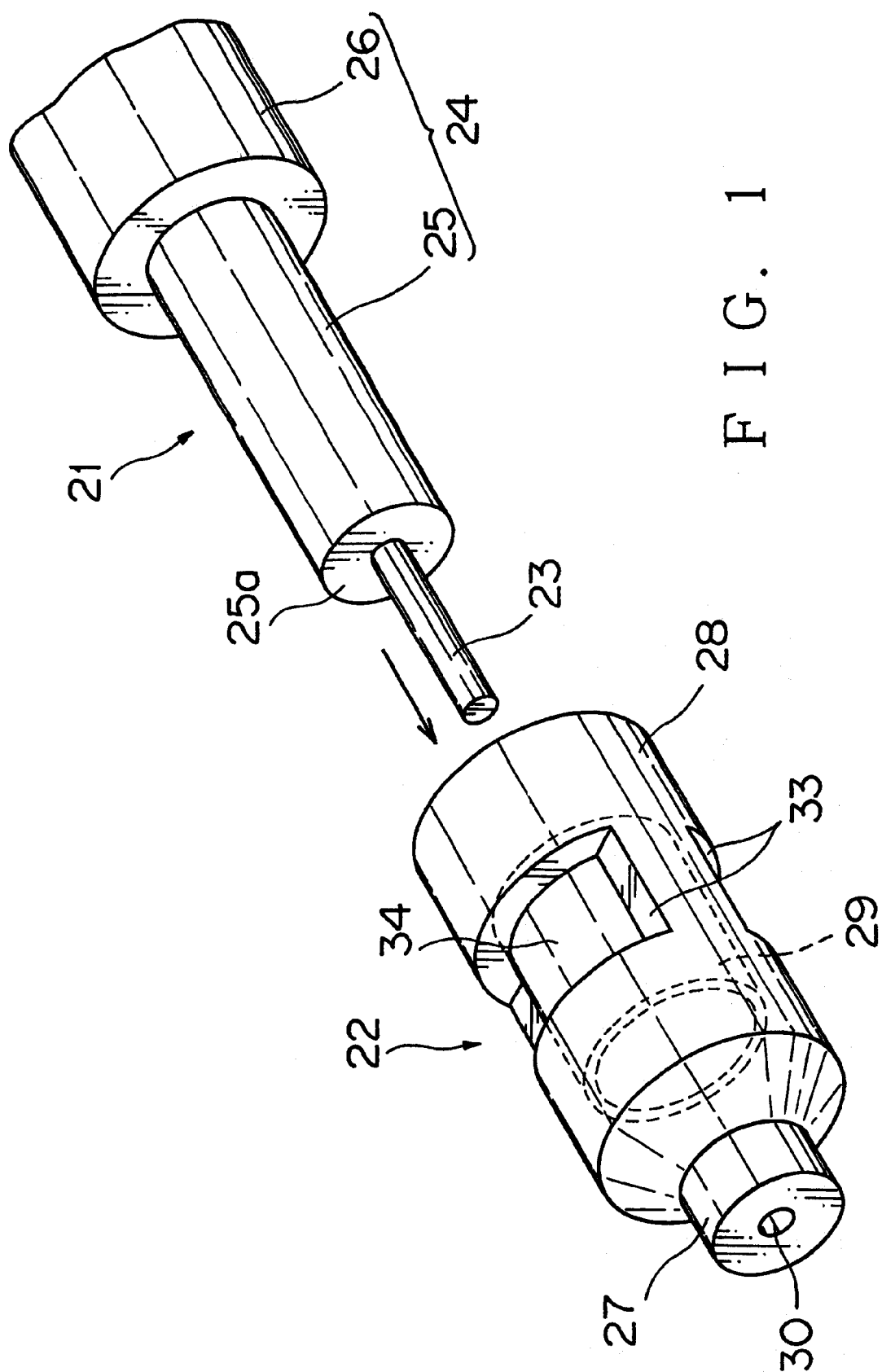
FIG. 1 is a perspective view of an embodiment of a ferule according to the present invention.

Now referring to the drawings, an explanation will be given of various embodiments of the present invention.

In FIG. 1, an optical fiber 21 includes a core 23 equipped with a cladding, and a sheathing 24 of synthetic resin for protecting it. The core 23 is not sheathed with the protective sheathing at its end over a prescribed length.

The sheathing 24 is composed of a primary sheathing 25 in close contact with the core 23 and a secondary sheath 26 arranged on outer face thereof. In this embodiment, although the core 23 is sheathed doubly, it may be sheathed by a single layer or any number of layers. As seen from FIG. 1, the face of the sheathing is stripped off stepwise.

Figure 2:
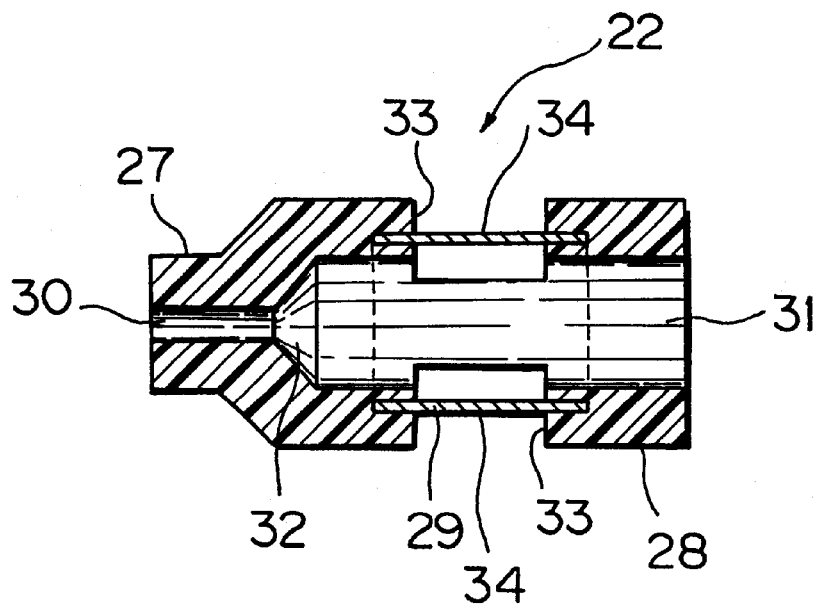
FIG. 2 is a sectional view of the ferule shown in FIG. 1.

As shown in FIGS. 1 and 2, a ferule 22 is composed of a core holder 27 of synthetic resin (which is preferably synthetic resin capable of providing high molding accuracy, such as PPS (polyphenylene sulfide), a sheathing holder 28 which communicates with the core holder 27 and resides on the outer wall of the primary sheath 25, and a cylinder 29 of metal, e.g. preferably soft metal such as aluminum, which is integrally molded with the sheathing holder 28. By caulking the metallic cylinder 29, the ferule 22 and optical fiber 21 are fixed to each other.

The ferule 22 is molded stepwise by the core holder 27 and sheathing holder 28. Thus, the core holder 27 having a smaller diameter has a core through-hole 30 having a diameter approximately equal to the diameter of the core 23, whereas the sheathing holder 28 having a larger diameter has a sheathing through-hole 31 having a diameter approximately equal to the diameter of the primary sheath 25 (FIG. 2).

A taper 32 is formed between the core holder 27 and the sheathing holder 28 so that it is brought into contact with the end face 25a of the primary sheath 25.

The sheathing holder 28 has windows 33 for the metallic cylinder 29 in its intermediate portion so that the metallic cylinder 29 is partially exposed or unwrapped. The portions of the cylinder 29 unwrapped by the windows 33 constitute a sheath caulking portion 34.

An explanation will be given of the method of processing the end of the optical fiber 21. The end of the optical fiber 21 will be processed by steps of ferule insertion, caulking and core trimming which are performed successively. It should be noted that the ferule 22 is prepared by a separate process.

Ferule Insertion

Figure 3:
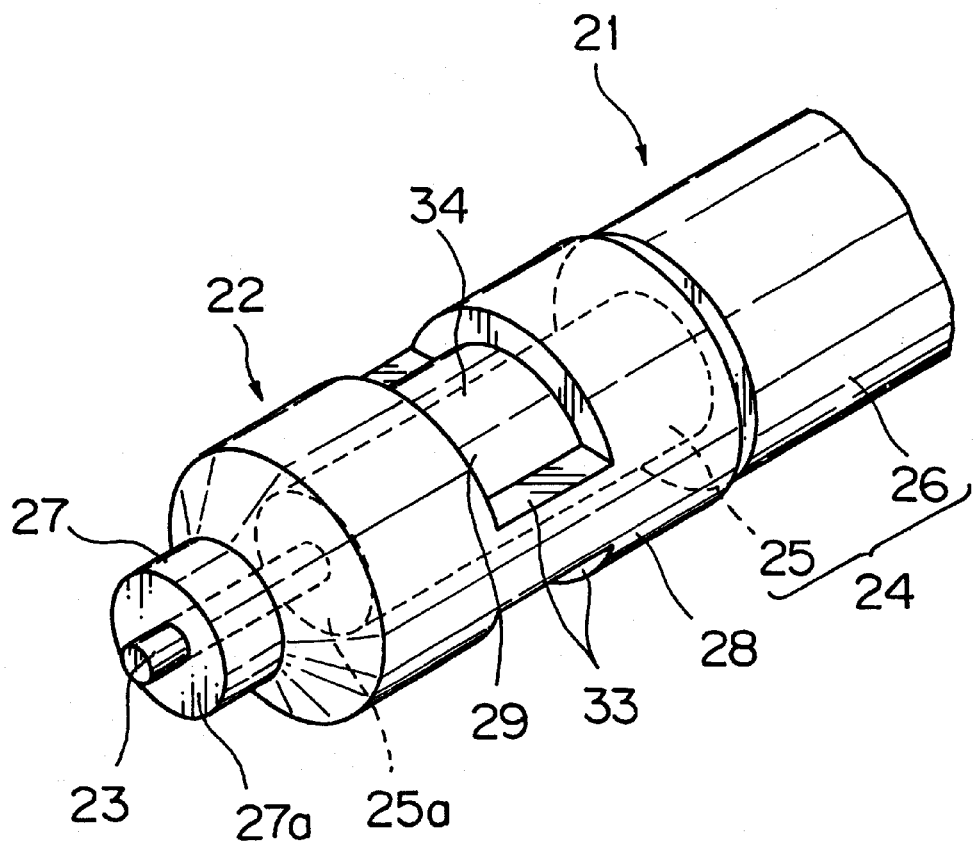
FIG. 3 is a perspective view of the state where an optical fiber has been inserted in the ferule.
Figure 4:
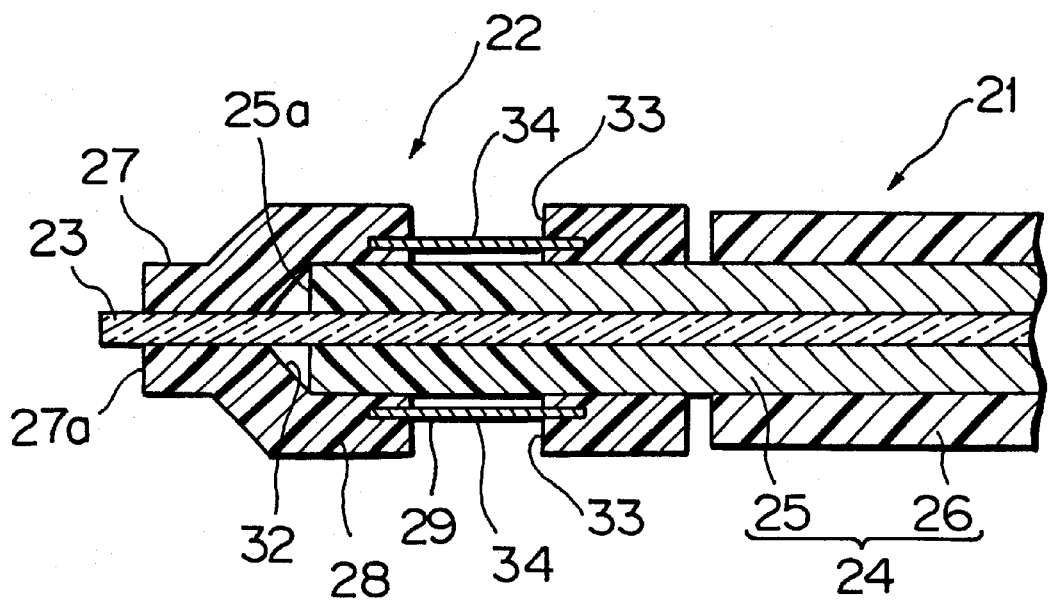
FIG. 4 is a sectional view of the state of FIG. 3.

The end of the optical fiber 21 is inserted into the ferule 22 along arrow in FIG. 1. The core 23 is inserted into the sheath holder 27 through the through-hole 31 so that the primary sheath 25 is inserted into the sheath through-hole 31. The optical fiber 21 is pushed into the ferule 22 until the end face 25a of the primary sheath 25 is brought into contact with the taper 32. When the optical fiber 21 has been completely pushed into the ferule 22, as shown in FIGS. 3 and 4, the core 23 protrudes from the end face 27a of the core holder 27.

Caulking

Figure 5:
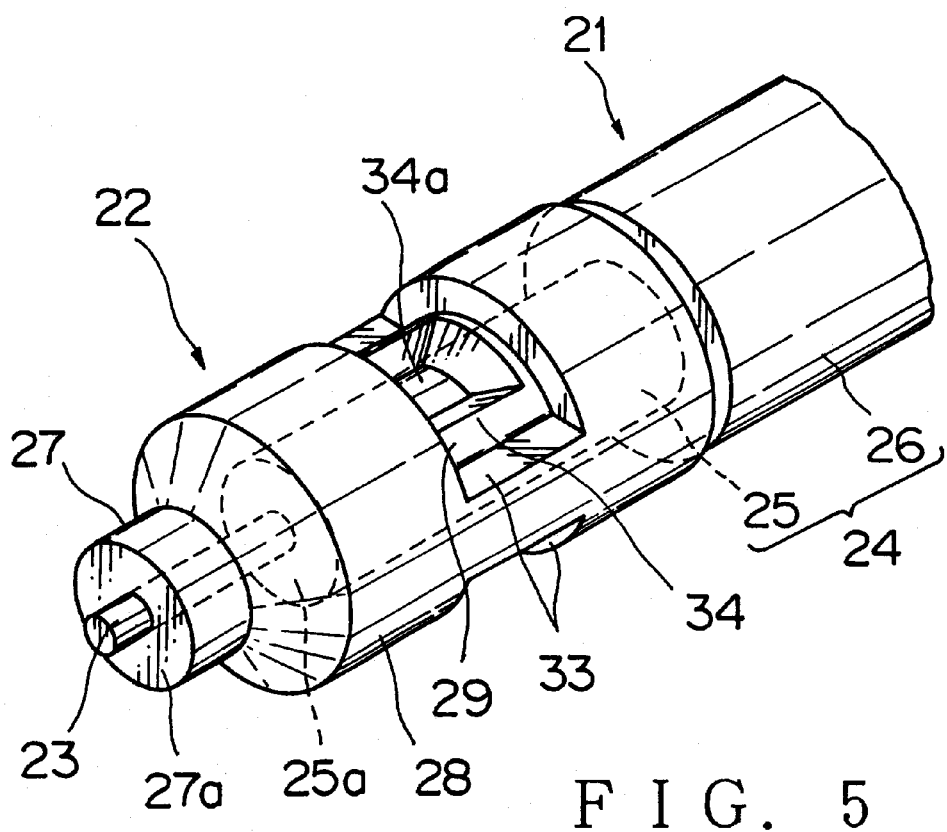
FIG. 5 is a perspective view of the state after caulking has been made for the state of FIG. 3.
Figure 6:
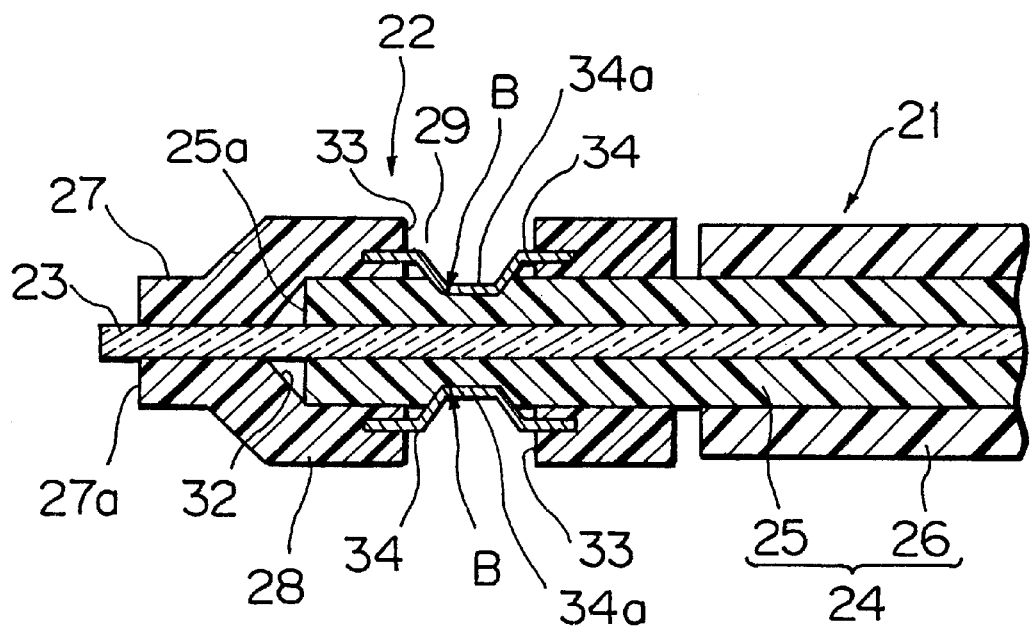
FIG. 6 is a sectional view of the state of FIG. 5.

With the product in the above state is set in a caulking device (not shown), the sheath caulking portions 34 of the metallic cylinder 29 unwrapped by the windows are caulked. caulking portions 34a are dented as shown in FIGS. 5 and 6 (only one is shown in FIG. 5) so that the primary sheathing is compressed toward the core 23. In this configuration, even if external force is applied to the optical fiber 21, the edge of the caulking portion 34a indicated by arrow B (FIG. 6) is caught by the primary sheath 25. Thus, the fixing force between the ferule and the optical fiber is not reduced and the optical fiber will not be readily fallen off.

Core Processing

Figure 7:
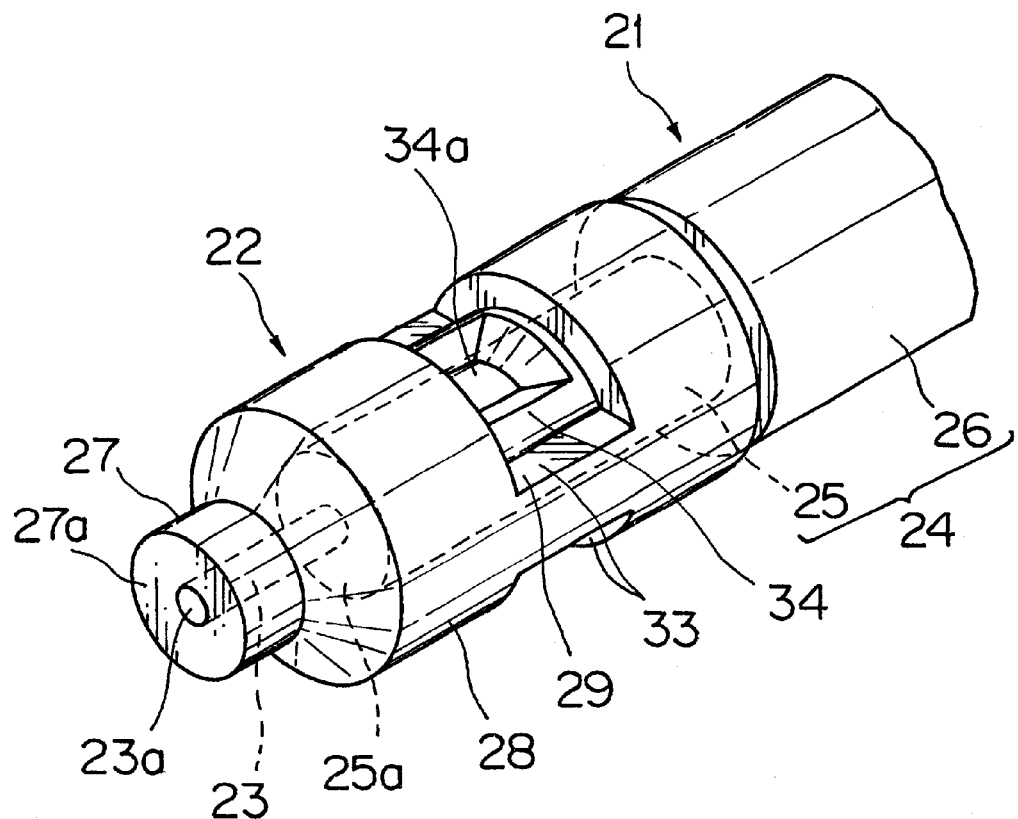
FIG. 7 is a perspective view of the state where the core is aligned with the end face of a core holder.

After the caulking, the assembly thus formed is set in a holding jig. As shown in FIG. 7, the end of core 23 which protrudes form the core holder 27 is trimmed (cut or ground) so that the end of the core 23 is aligned with the end face of the core holder 27. This prevents random reflection of light at the end face of the core 23 and reduces optical loss there.

Figure 8:
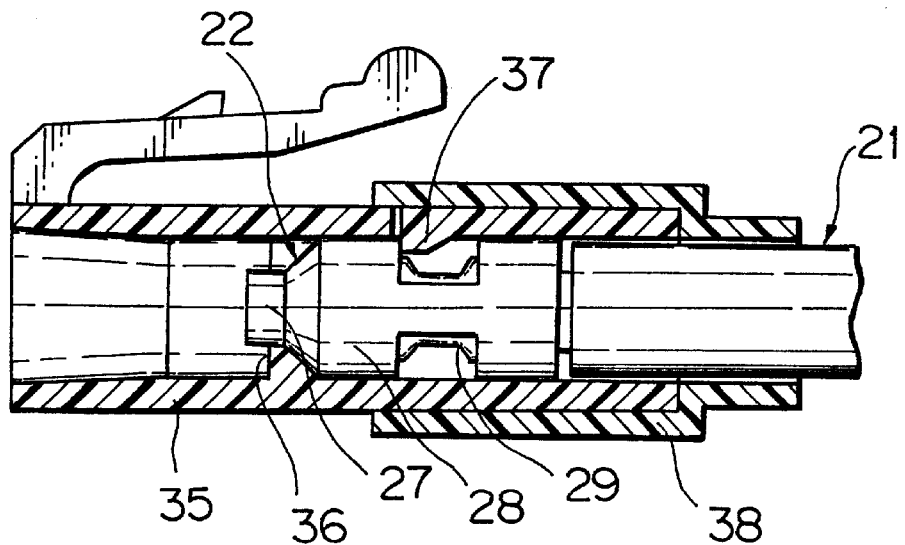
FIG. 8 is a sectional view of the state where the ferule has been mounted in an optical connector housing.

An explanation will be given of the processing after the end of the optical fiber 21 has been processed. The optical fiber 21 is mounted in a hollow optical connector housing 35 as shown in FIG. 8.

The optical connector housing 35 has a stopper 36 for the core holder 27 and a lance 37 to be engaged with the ferule 22. The lance 37 is engaged with the a stepped portion formed by the sheathing holder 28 and metallic cylinder 29. The opening of the front end of the optical connector 35 is sealed by a receptacle (not shown), whereas the rear end thereof is covered with a cap 38.

As understood from the description hitherto made referring to FIGS. 1 to 8, the optical fiber 21 and the ferule are fixed to each other without using an adhesive.

Specifically, with the optical fiber 21 whose end is void of the sheathing 24 being inserted into the ferule, the sheath caulking portions 34 of the metallic cylinder 29 can be caulked to compress the primary sheath 25 toward the core 23. Thus, the above fixing can be completed.

The fixing force can be easily altered by changing the positions and areas subjected to caulking. The sheath caulking portions can be easily taken out since they are unwrapped. Thus, the caulking position is not shifted so that the operation of caulking can be stabilized every time, thereby keeping the fixing force constant.

The ferule 22, which can be previously manufactured by a separate process, does not exert an influence on the operation of fixing to the optical fiber 21.

Since a large space is not required for the caulking, a change in the layout of a manufacturing location is not required.

Since the core holder 27 is made of synthetic resin, when the optical fiber is mounted in the optical connector housing 35, or it is received by the receptacle (not shown), the optical connector housing or receptacle will not be injured.

Since the sheath caulking portions 34 are centrally located in the longitudinal direction of the sheath holder 28, the caulking positions can be made unaltered. Additionally, if the shape of the product after caulking is fixed, when the assembly is mounted in the optical connector housing 35, a play or clearance of the ferule 22 for the optical connector housing 35 is also unaltered. This makes it easy to design the optical connector using the optical connector housing 35.

Since the sheath caulking portions, i.e. windows 34 are located of the outer wall of the sheathing holder 28, i.e., on the side of the core 23, the sheath caulking portions 34 will not protrude from the sheathing holder 28.

Figure 9:
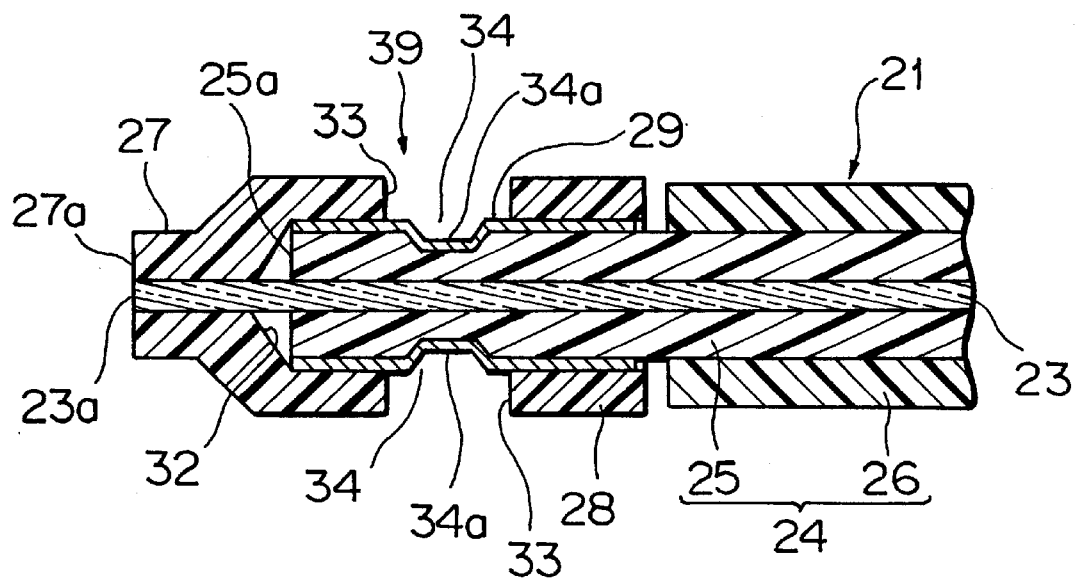
FIG. 9 is a sectional view of another embodiment of the ferule according to the present invention.

FIG. 9 shows an sectional view of another embodiment of the ferule according to the present invention. In FIG. 9, like reference numerals refer to like elements in FIGS. 1 to 8.

As seen from FIG. 9, in this embodiment, the ferule 39 is structured so that the metallic cylinder 29 is pressed into the entire sheath through-hole 31 of the sheath holder 28 communicating with the core holder 27. In this embodiment also, the ferule 39 can be prepared in a separate step.

Figure 10:
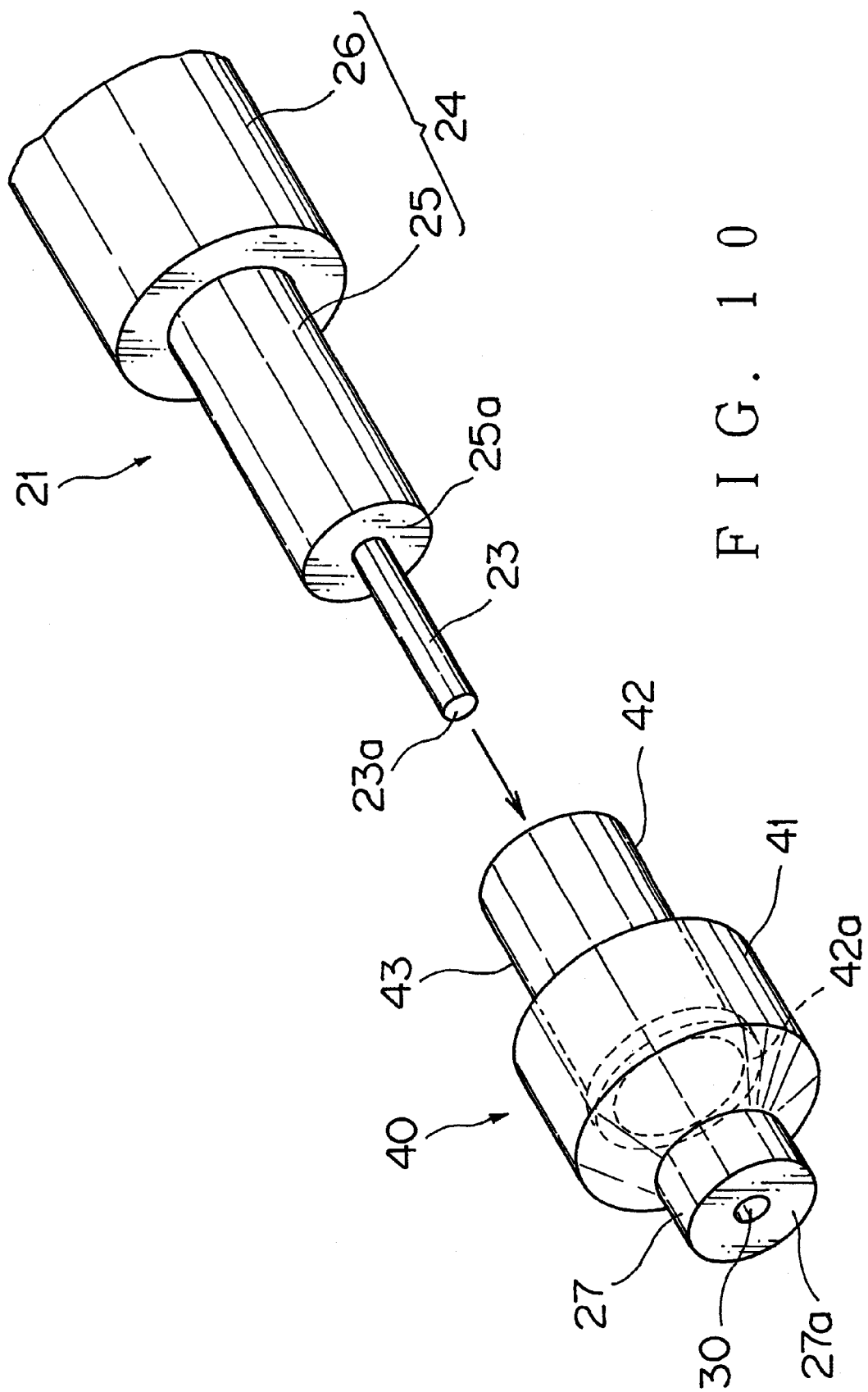
FIG. 10 is a perspective view of still another embodiment of the ferule according to the present invention.
Figure 11:
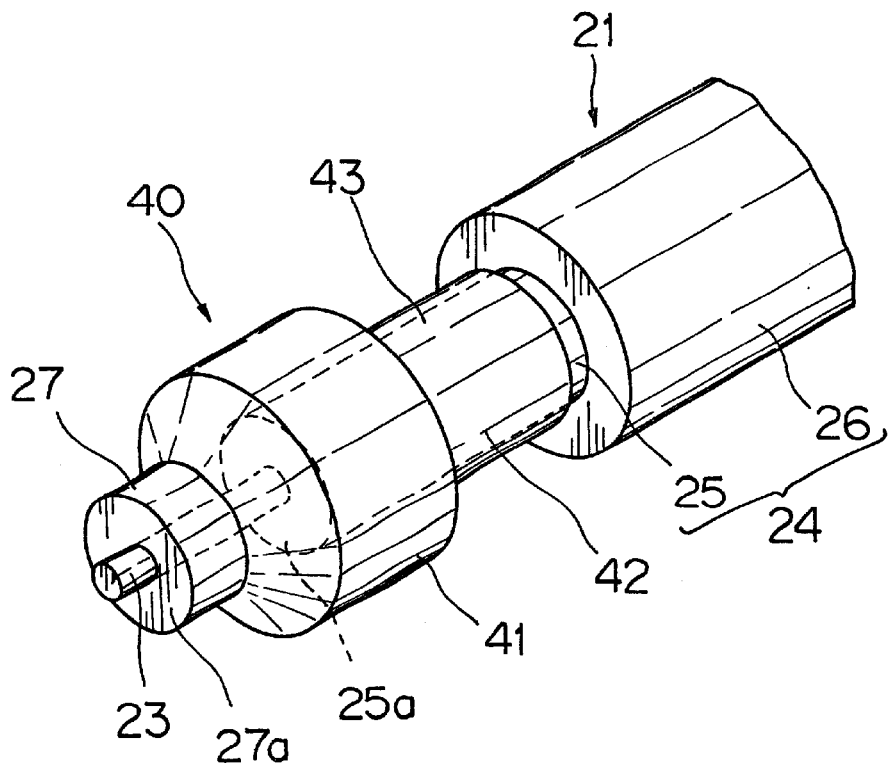
FIG. 11 is a perspective view of the state where an optical fiber has been inserted into the ferule of FIG. 10.

FIG. 10 shows an sectional view of still another embodiment of the ferule according to the present invention. In this embodiment also, like reference numerals refer to like elements in FIGS. 1 to 8.

The ferule 40 is structured so that a metallic cylinder 43 having a flange 42a is integrally molded with a short sheath holder 41 which communicates with the core holder 27 and the metallic cylinder 43 is extended to be unwrapped from the intermediate portion in a range where the primary sheath 25 is protected. Incidentally, reference numeral 43 denotes sheath caulking portions and reference numeral 44 denotes a taper.

An explanation will be given of the method of processing the end of the optical fiber 21. Like the previous embodiment, the end of the optical fiber 21 will be processed by steps of ferule insertion, caulking and core processing (trimming) which are performed successively. It should be noted that the ferule 40 is prepared by a separate process.

Ferule Insertion

Figure 12:
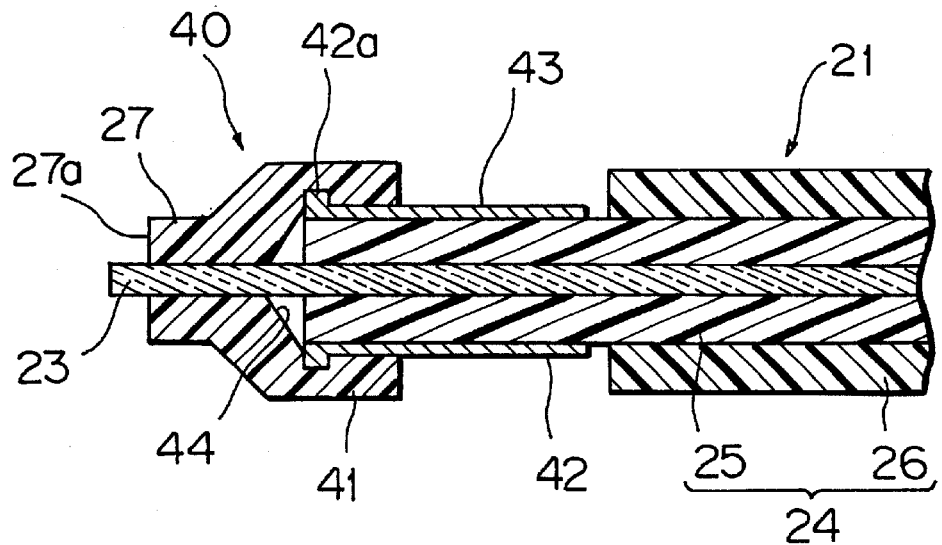
FIG. 12 is a sectional view of the state of FIG. 11.

The end of the optical fiber 21 is inserted into the ferule 40 along arrow in FIG. 10. The core 23 is inserted into the sheath holder 27 through the through-hole 31 so that the primary sheath 25 is inserted into the cylinder 42. The optical fiber 21 is pushed into the ferule 40 until the end face 25a of the primary sheath 25 is brought into contact with the taper 44 (FIG. 12). When the optical fiber 21 has been completely pushed into the ferule 40, as shown in FIGS. 1 and 12, the core 23 protrudes from the end face 27a of the core holder 27.

Caulking

Figure 15:
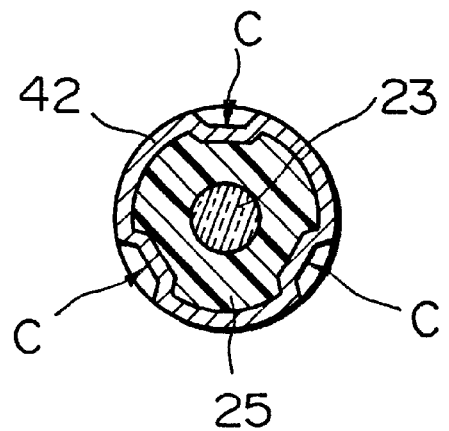
FIG. 15 is a sectional view of another caulked state.
Figure 16:
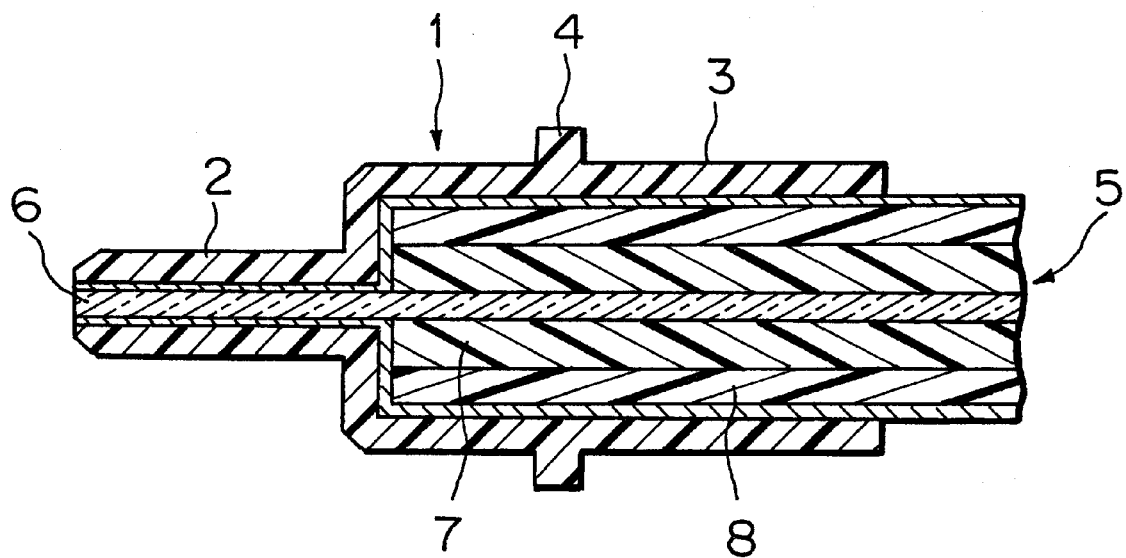
FIG. 16 is a sectional view of the securing state of an optical fiber and a ferule according to a prior art.

With the assembly in the above state is set in a caulking device (not shown), the sheath caulking portions 43 unwrapped partially by the windows are caulked. Caulking portions 43a are dented as shown in FIGS. 13 and 14 (only one is shown in FIG. 13) so that the primary sheath 25 is compressed toward the core 23. Incidentally, as shown in FIG. 15, the metallic cylinder 42 maybe caulked at three positions in circumference.

Core processing

After the caulking, the assembly is set in a holding jig. As shown in FIGS. 13 and 14, the end of core 23 which protrudes form the core holder 27 is trimmed (cut or ground) so that the end of the core 23 is aligned with the end face of the core holder 27. This prevents random reflection of light at the end face of the core 23 and reduces optical loss there.

The ferule 40 having such a configuration can provide the same effect as the ferule 22 and 39 in the previous embodiments.

What is claimed is:

1. A ferule structure for receiving a fiber composed of a core and a sheathing for covering the core exclusive of its end, comprising a core holder for holding said core;

a sheathing holder for holding said sheathing, said sheathing holder communicating with said core holder and being located on an outer wall of said sheathing; and a metallic cylinder member for fixing said sheathing, said metallic member being formed integrally to said sheathing holder, wherein said sheathing holder has a window from which said metallic cylinder member is partially exposed; and said metallic cylinder member is caulked through the window so that said sheathing is compressed toward said core.

2. A ferule structure according to claim 1, wherein said window is located centrally in said sheathing holder in its longitudinal direction.

3. A ferule structure according to claim 1, wherein said metallic cylinder member is located internally of the outer periphery of said sheathing holder.

4. A ferule structure according to claim 1, wherein said sheathing holder has an internal taper with which said sheathing is brought into contact.

5. A ferule structure according to claim 4, wherein said metallic cylinder member has a flange to be engaged in a skirt of said taper.

6. A ferule structure according to claim 1, wherein said core and said core holder are aligned with each other in their end faces.

7. A ferule structure according to claim 1, wherein the core holder is made of synthetic resin.

8. A method of processing and end of an optical fiber using the ferule structure according to claim 1, comprising the steps of:

inserting said optical fiber into said ferule until the core of the optical fiber protrudes from said core holder;

caulking said metallic cylindrical member so that said optical fiber and said ferule are fixed to each other; and cutting or grinding a portion of said core protruding from said core holder so that said core and said core holder are aligned with each other in their end faces.

9. An assembly of an optical fiber and a ferule comprising:

an optical fiber composed of a core and a sheathing covering the core exclusive of its end; and a ferule for receiving said optical fiber, said ferule including a core holder for holding said core, a sheathing holder for holding said sheathing, said sheathing holder communicating with said core holder and being located on an outer wall of said sheathing; and a metallic cylinder member for fixing said sheathing, said metallic member being formed integrally to said sheathing holder, wherein said sheathing holder has a window from which said metallic cylinder member is partially exposed and said metallic cylinder member is caulked through the window so that said sheathing is compressed toward said core.

* * * * *